(12) United States Patent
Hirschberg

(10) Patent No.: US 11,155,027 B2
(45) Date of Patent: Oct. 26, 2021

(54) LAYER-BY-LAYER PRODUCTION OF MOLDED ARTICLES

(71) Applicant: HIRSCHBERG ENGINEERING AG, Winterthur (CH)

(72) Inventor: Sebastian Hirschberg, Winterthur (CH)

(73) Assignee: HIRSCHBERG ENGINEERING AG, Winterthur (CH)

( * ) Notice: Subject to any disclaimer, the term of this patent is extended or adjusted under 35 U.S.C. 154(b) by 354 days.

(21) Appl. No.: 15/536,782

(22) PCT Filed: Dec. 7, 2015

(86) PCT No.: PCT/CH2015/000179
§ 371 (c)(1),
(2) Date: Jun. 16, 2017

(87) PCT Pub. No.: WO2016/095060
PCT Pub. Date: Jun. 23, 2016

(65) Prior Publication Data
US 2017/0348912 A1    Dec. 7, 2017

(30) Foreign Application Priority Data

Dec. 19, 2014 (WO) ................ PCT/CH2014/000177

(51) Int. Cl.
*B33Y 10/00*        (2015.01)
*B29C 64/245*      (2017.01)
(Continued)

(52) U.S. Cl.
CPC .......... *B29C 64/106* (2017.08); *B29C 64/129* (2017.08); *B29C 64/245* (2017.08); *B33Y 10/00* (2014.12); *B33Y 30/00* (2014.12)

(58) Field of Classification Search
CPC ... B29C 64/245; B29C 64/129; B29C 64/106; B33Y 10/00; B33Y 30/00
See application file for complete search history.

(56) References Cited

U.S. PATENT DOCUMENTS 5,948,342 A * 9/1999 Nakazawa ............ B29C 64/153
                                                          264/400
7,658,976 B2   2/2010 Kritchman
(Continued)

FOREIGN PATENT DOCUMENTS

DE         43 32 982 A1      3/1995
WO   WO 2014/043823 A1      3/2014
WO   WO 2014/165265 A1    10/2014

OTHER PUBLICATIONS

Translation of DE 4332982A1 (Year: 1995).*
Office Action dated Dec. 15, 2020 in corresponding Indian Application No. 201717020683.

*Primary Examiner* — Francisco W Tschen
(74) *Attorney, Agent, or Firm* — Birch, Stewart, Kolasch & Birch, LLP.

(57) ABSTRACT

The invention relates to a method for manufacturing molded articles consisting of at least one molded article layer, said method comprising the steps of a) putting a layer support in place for accommodating at least one molded article layer; b) applying a molded article layer to a printing plate using a shaping tool; c) positioning the printing plate and the layer support or a previously produced molded article layer relative to one another; d) curing the molded article layer such that said layer becomes a previously molded article layer, and transferring the molded article layer; e) if necessary, putting the printing plate in place for accommodating additional molded article layers and repeating steps b) to d). The invention further relates to an apparatus for carrying out the disclosed method as well as to the use of molded articles obtained thereby.

15 Claims, 7 Drawing Sheets

(51) Int. Cl.
*B29C 64/106* (2017.01)
*B33Y 30/00* (2015.01)
*B29C 64/129* (2017.01)

(56) References Cited

U.S. PATENT DOCUMENTS

| | | | |
|---|---|---|---|
| 2001/0051585 A1* | 12/2001 | Ryu | C03C 3/074 501/76 |
| 2002/0017743 A1* | 2/2002 | Priedeman, Jr. | B29C 41/36 264/464 |
| 2005/0049739 A1* | 3/2005 | Kramer | B33Y 10/00 700/119 |
| 2007/0001581 A1* | 1/2007 | Stasiak | B82Y 20/00 313/498 |
| 2007/0283660 A1* | 12/2007 | Blahut | E04C 3/29 52/841 |
| 2010/0125356 A1* | 5/2010 | Shkolnik | G06T 5/006 700/98 |
| 2011/0121476 A1* | 5/2011 | Batchelder | B33Y 40/00 264/40.1 |
| 2014/0050969 A1* | 2/2014 | Rust, III | H01M 10/0525 429/160 |
| 2015/0246484 A1 | 9/2015 | Hirschberg | |

* cited by examiner

LAYER-BY-LAYER PRODUCTION OF MOLDED ARTICLES

TECHNICAL AREA

The invention relates to methods for producing molded articles from at least one molded article layer. It furthermore relates to apparatuses for producing a molded article from at least one molded article layer and to the use of said molded article, all in accordance with the generic parts of the independent claims.

PRIOR ART

3-D printing concerns finishing methods for constructing three-dimensional workpieces layer-by-layer and automatically. Customarily, a predefined form is produced during 3-D printing from a starting material. Typical materials used in 3-D printing are plastics, resins, ceramics and metals. Especially in rapid-prototyping, which is presently very current, a plurality of possible forms and structures should be produced if possible without manual effort. The versatility of the printing machine is in the foreground here for replicating structurally and step-by-step a defined form computer-supported by the user from the moldable mass as starting material. These apparatuses and methods concern, as the name already states, the production of "prototypes", that is, largely individual pieces. Accordingly, most of the apparatuses and methods are not suited for an industrial mass manufacture since they do not have large turnover numbers and are expensive as concerns material and energy.

There is therefore a need for making methods and apparatuses available in order to make possible a layer-by-layer construction of three-dimensional structures in an efficient and industrially scalable manner.

In addition to the application area of the production of prototypes, unicums and visualizations, which is interesting for rapid prototyping, 3-D printing can be used for making molded articles which can be used industrially and technically. Such molded articles are shown in WO 2014/043823 A1 (Hirschberg Engineering). These molded articles comprise branched webs and layers which are especially suitable for applications in flow-driven processes. Among other things, the molded articles shown can be used as static mixers or heat exchangers or for emulsifying or forming substances or as catalytic surfaces and chemical reactions. The molded articles are produced in that a plastically deformable mass is applied layer-by-layer by a template. The layers can be cured step-by-step or at the end after the finished molded article is present. Here, each layer is applied by a suitable, associated template onto the previous layer. The curing is carried out by drying, UV curing or some other induced curing. The recesses of the template used as mask or sieve determine the form of the particular layers here.

PRESENTATION OF THE INVENTION

Starting from this known prior art and the above-cited need, the present invention has the problem of making available a method for the layer-by-layer construction of molded articles with at least one molded article layer which is especially suitable for being industrially automated and is on the whole more efficient. In particular, a method should be made available which is suitable for mass production.

The solution of at least one of the cited problems is defined by the characterizing part of the independent claims.

An aspect of the present invention relates to a method for producing molded articles from at least one molded article layer. The method of the invention comprises a series of steps. In a first step a layer carrier is made available for accommodating at least one molded article layer. A molded article layer is applied onto a printing plate, wherein the molded article layer is applied by a shaping tool onto this printing plate. It should be retained that in the context of the present invention method steps which do not logically have to obligatorily follow one another or in the case of which a sequence is not explicitly mentioned do not have to take place exclusively in the sequence which takes place in the present enumeration. In this concrete case the making available of the layer carrier can take place, for example, simultaneously with the application of the formed article layer on the printing plate by the shaping tool. Furthermore, the method according to the invention comprises the step that the printing plate and the layer carrier are positioned relative to one another. At this time a first or a plurality of older molded article layers can be present on the layer carrier which were transferred onto it in previous passages of the method according to the invention.

In the sense of the present invention the relative positioning of the printing plate can denote that either the printing plate or the layer carrier or both execute a movement during which the molded article layer makes contact on the printing plate with either the layer carrier or an older molded article layer that was in any case already present on it. The printing plate and the layer carrier are preferably positioned in such a manner relative to one another that the molded article layer is aligned exactly as desired on the layer carrier during the transfer from the printing plate onto the layer carrier.

The molded article layer is cured in a further step. A cured molded article layer becomes an older molded article layer in the context of the method of the invention or it enters into a composite with an already existing, older molded article layer. This curing step can take place in particular at the time at which the printing plate and the layer carrier are positioned relative to one another. In this state the layer carrier and the printing plate can form mechanical supports for the not yet cured molded article layer.

Accordingly, the molded article layer of the current method step can be transferred onto one or more older molded article layer(s), wherein the printing plate or the older molded article layer(s) are accordingly positioned relative to one another. A transfer of the molded article layer comprises a separation from the printing plate. For subsequent passages the cured, transferred molded article layer therefore becomes an older molded article layer. In the sense of the present invention an older molded article layer is defined in relation to the current molded article layer. That is, each molded article layer preceding a molded article layer is an older molded article layer relative to this latter one. Alternatively, the molded article layers can be sequentially numbered regarding their number. Therefore, the first molded article layer transferred on a layer carrier is the first molded article layer. The second molded article layer is accordingly the second, etc. Of course, the first molded article layer would be the older molded article layer as regards the second one. The number of repetitions made is a function of the desired final form of the resulting molded article and can be individually selected by a person skilled in the art. Accordingly, the last step of the method of the invention comprises the eventual making the printing plate available for accommodating other molded article layers and the subsequent repetition of the above-cited method steps. In a special embodiment an older molded article layer is at the same time a cured molded article layer.

In the sense of the present invention the molded article resulting from the method of the invention is insofar constructed from at least one molded article layer since this is a direct result from the method. However, the resulting molded articles are basically not limited to the recognizability of the individual molded article layers which is conditioned after the conclusion of the process. Also, the resulting molded articles are not limited to rectangular, flat layers or layers with a homogenous thickness.

In a special embodiment of the method of the invention the shaping tool is a template. The template can be designed in such a manner that it can be positioned as a level surface over the printing plate. Recesses in the template define the shape of the molded article layer applied by the appropriate templates. A template or a shaping tool can define a plurality of identical or different shapes for molded article layers.

Molded article layers can be rapidly constructed and applied in an automated manner. As a result, the method of the invention is especially good for mass production.

In a special embodiment the shaping tool is a sieve, in particular a sieve for technical sieve printing.

Another advantage of the method of the invention is that it is suited for sieve printing as well as for template printing. This is simplified in particular by the fact that the step of the application of the molded article layer on the layer carrier takes place indirectly, that is, that at first the molded article layer is transferred from a printing plate with an already defined form onto the layer carrier. Due to this indirect printing method a combination of sieve- and of template printing can be used for appropriate layers in the present method.

In a special embodiment the printing plate is designed to be level. This has the advantage that, especially for template printing, a perfectly level support results in especially good printing results in the individual molded article layer. However, even in sieve printing a level printing plate is advantageous for the printing result of the individual molded article layers.

Without being bound to this theory, one of the advantages of the invention seems to be that the printing plate supplies an additional hold to the molded article layers until they are cured. As a result, it is possible to print more complex patterns which do not have to rest completely on older molded article layers.

In a special embodiment the printing plate is designed so that the molded article layer poorly adheres to it. The molded article layer is transferred from the printing plate onto the layer carrier or onto the older molded article layer. In order to facilitate the transfer, it is advantageous if the molded article layer does not excessively adhere to the printing plate. The adhesion of a cured paste on a surface is a function of the surface form as well as of the pairing surface-paste. For a slight adhesion a chemical connection of the paste to the surface must be excluded, the surface structure must be smooth and the surface must have the lowest possible surface energy. Surface energies less than 40 mN/m, in particular surface energies less than 30 mN/m and especially surface energies less than 20 mN/m are considered low in the sense of the present application.

In a special embodiment the material of the printing plate is designed in such a manner that the molded article layer adheres poorly to it. Additionally, or in an alternative embodiment the surface of the printing plate can be worked in such a manner that the molded article layer readily separates off in the corresponding transfer step. This is basically possible by a surface treatment of the printing plate. The surface treatment can be permanent, that is, the printing plate is provided with an appropriate surface treatment which already took place in the manufacturing process of the printing plate. Alternatively or additionally, the printing plate can be equipped with a temporary system of surface treatment. For example, it is possible to coat the printing plate with a wax or resin or a powder which is consumed in the course of the applications of the printing plate and must be repeatedly applied. Accordingly, structures can be provided in an apparatus for carrying out the method of the invention which make this coating in periodic intervals or before each usage of the printing plate.

In a special embodiment the adhesion behavior of the printing plate is lowered by stoving siliconization. In an alternative, special embodiment the printing plate is provided with a coating containing fluoropolymers.

In a special embodiment the adhesion behavior of the printing plate is lowered by a layer of polydimethylsiloxane or of other polysilanes.

In a special embodiment a thin coating is applied on the printing plate before each use. In a preferred embodiment layers containing grease or wax are applied on the printing plate before each use.

Alternatively, even dry lubricants or dry sliding layers such as are known from dry lubrication can be used to lower the adhesion properties of the printing plate. Transparent dry sliding layers based on synthetic waxes are preferred.

In a special embodiment thermally treated silicate layers are used. Water-soluble soda silicates, lithium silicates or potassium silicates can be applied in liquid form and harden during drying to glassy, amorphous layers. It surprisingly turned out, especially when pastes with acryl-based photopolymers are used to form the molded article layers, that a coating of the printing plate with a thin layer of soda silicate which is heated prior to use in an oven for half an hour at about 100° C. yields especially good results.

In a special embodiment the older molded article layer on the layer carrier or the layer carrier itself is provided in a method step with an adhesion promotor before a next, other molded article layer is applied on it. This step preferably comprises a dipping in, spraying or moistening by a stamp pad of the layer carrier with this adhesion promoter.

An adhesion promoter can have the result that the connection between the current molded article layer and the older molded article layer is improved. To this end the front surface of the older molded article layer, which is already cured, is moistened, for example, with a thin, liquid adhesion promoter. Different adhesion promoters can be employed depending on the material used. In particular in the case of pastes based on photopolymers, for example, monomers without photoinitiator can be used which moisten only upon contact with the pastes containing the appropriate photoinitiator. This adhesion promoter remains liquid even under the action of UV radiation where the new molded article layer does not touch the older, already cured molded article layer. In the case of acryl-based photopolymers and their thin, liquid monomers, photoinitiators can be alternatively mixed into the monomer used as adhesion promoter. In this case the thin monomer layers do not cure if they are not covered by the paste of the new molded article layer since the polymerization is inhibited by the oxygen in the air in the very thin adhesion promoter layers. In a special embodiment of the method of the invention a plastically deformable mass is supplied through the recesses of the shaping tool onto the printing plate in order to form the molded article layer. Suitable, plastically deformable masses can be selected by the person skilled in the art in accordance with the desired area of application, the intended curing process and the availability of material.

The plastically deformable masses have rheological properties suited for the printing by the shaping tools. Formable masses with thixotropic properties are especially preferred. Such plastically deformable masses flow well under shearing stress but are additionally inherently stable on the printing plate. Suspensions are especially suitable. Suspensions can comprise fine-grain powder as the main component which is selected in accordance with the material of the desired molded article. For example, metals, metal alloys, high-grade steel or noble metals as well as ceramic materials and/or glass ceramic materials are suitable. In particular, organic binders are added for forming a plastically deformable material. Materials which can be used, for example, as organic binders are, among others, CMC (carboxymethylcellulose), polyolefin and various forms of natural starch (corn meal, wheat meal, etc.) Alternatively, various types of photopolymers can be used as organic binders. Monomers and oligomers as well as their mixtures are designated as photopolymers which begin to polymerize by the action of a photoinitiator admixed in slight amounts of typically less than 5% by the radiation of light, typically in the ultraviolet range. There is a large number of different photopolymers. Acrylic monomers are preferred such as, among others, for example, hexane-1,6-diol diacrylate, trimethylpropane triacrylate, poly (ethylene glycol) diacrylate, which were compounded with slight amounts of photoinitiators such as, among others, for example, 0.5% 2,2-dimethoxy-2-phenylacetophenone and can be considered as binder material. Depending on the requirements, these monomers can be mixed with different oligomers of polyacrylates.

If the plastically deformable mass is provided for a sintering step, which is the case, for example, for ceramic materials, metals or glass, it contains a high amount by volume of the powder to be sintered, in particular >35% by volume, furthermore in particular >50% by volume.

In a special embodiment the plastically deformable masses comprise additional additives which can be used for changing the rheological properties of the mass such as, for example, dispersion aids. Such additives are known to the person skilled in the art and can be selected by him adapted to the situation and the required conditions (Journal of Engineering, volume 2013 (2013), Article ID 930832).

In an alternative special embodiment the plastically deformable mass comprises pure plastic parts. They can comprise appropriate monomers and/or oligomers which are later polymerized. Such plastically deformable masses can also contain additional additives for adjusting the rheological properties such as solvents, pigments, catalysts or biocides.

In a special embodiment the plastically deformable mass can contain power of a base material as suspension, selected from the group consisting of: metals, steel alloys, hard metals, colored metals, noble metals, ceramic materials, metal-ceramic-composite materials, glass, plastics and/or plastic-composite materials with fiber reinforcement or metal particles or particles of ceramic materials. Even mixtures of these materials are conceivable.

In a special embodiment a molded article layer is constructed from several partial molded article layers which are pressed individually in series onto the printing plate and are fitted into the molded article layers and cured. The individual partial molded article layers can consist of the same or of different pastes, as a result of which molded article layers can be prepared which are constructed of several different materials.

In a special embodiment a plurality of plastically deformable masses with different properties are applied through various recesses in the shaping tool onto the printing plate for forming the molded article layer. As a result, a molded article layer can be formed which consists of different materials.

These two embodiments can be provided in this manner, for example, in the desired final product, that is, the molded article. Another possible application would be to use one or more additional materials which are subsequently modified. The latter can be used as filling structures or supporting structures which impart a better stability to the molded article being constructed during the construction process. These filling structures or supporting structures can subsequently be removed from the molded article again by mechanical, chemical or thermal methods.

If a sintering material from the above-described group is used, such as, for example, metals, metallic alloys, ceramic materials glass or composites of these materials as a plastically deformable mass, then the method of the invention comprises a thermal treatment of the molded article for the sintering which is carried out after the conclusion of the forming process of the molded article.

In a preferred embodiment the molded article is sintered at temperatures between 500 and 2,500° C., preferably between 600 and 1,700° C.

In a special embodiment the layer carrier is designed in such a manner that the molded article layers adhere well to it. This can be controlled by the selection of the material of the layer carrier or by a coating of the layer carrier. If the layer carrier is not to be used in a thermal treatment following the construction of the molded article, an aluminum alloy, for example, is a suitable material for layer carriers for pastes with acryl-based photopolymers.

In a special embodiment which comprises a sintering step, the layer carrier is designed in such a manner that that it is suited as carrier for the sintering process. To this end the layer carrier must be designed in such a manner that it can withstand without being damaged the temperature generated in the sintering step. The layer carrier preferably consists of a ceramic material such as, for example, aluminum oxide, corundum, silicon carbide or sapphire. Alternatively, graphite or carbon fibers can be used as material for the layer carrier. During the printing process the molded layer must adhere well to the layer carrier. If the molded article is to be sintered at the end of the production process and the layer carrier is also to be used as sintering support in the sintering process, the molded article produced must be separated from the layer body in order that the molded article can expand and in particular shrink relative to the layer carrier. To this end the layer carrier is preferably provided with a coating. The layer carrier is especially preferably provided with a polyvinyl butyral (PVB) layer. At the beginning of the sintering process with temperatures between 500 to 600° C. this coating disintegrates substantially without residue and therefore makes possible an unimpeded shrinking of the molded article in the following course of the sintering process.

In a special embodiment the method of the invention comprises a polymerization step. This is preferably a polymerization step selected from the group consisting of: photo-induced, thermally induced or chemically induced polymerization.

The method of the invention especially preferably comprises a photopolymerization step. In this step a molded article layer is cured on the printing plate and in contact with the layer carrier or the older, already cured molded carrier layers. To this end the appropriately selected, plastically deformable mass is loaded with light with the appropriate wavelength in order to start the polymerization reaction. For this, an appropriate addition of photopolymers is added to the plastically deformable mass. This loading of the plastically deformable mass of the molded article layer preferably takes place by the printing plate. To this end the printing plate must be transparent for the light with the appropriate wavelength. A different wavelength is required here according to the photoinitiator used. As a rule, the photopolymerization is initiated with shortwave light, that is, light in the ultraviolet spectrum. A printing plate of quartz glass or sapphire glass proved to be suitable. The printing plate is preferably selected from a material which does not change its permeability to UV light over a rather long time.

In an alternative embodiment the curing of the molded article layer can take place by a physical process such as, for example, drying and/or cooling off. In a concrete example a melt would be used as plastically deformable mass which solidifies after having cooled off. Therefore, the method of the invention could also be carried out with a thermoplastic as plastically deformable mass. Alternatively, the curing could take place by a drying and/or complexing and/or crystallization such as takes place, for example, during the evaporation of a solvent in an adhesive or during the hardening of cements.

In a special embodiment the printing plate and the layer carrier are positioned relative to one another in such a manner that the molded article layer on the printing plate touches the layer carrier or the older molded article layer and is exactly aligned on the layer carrier respectively relative to the older molded article layers as necessary for the production of the desired molded article.

In a special embodiment the layer thickness of each molded article layer is constant.

In an alternative special embodiment the layer thicknesses of the individual, commonly applied molded article layers are variable. For example, a shaping tool could be selected which comprises recesses for defining a plurality of molded article layers. All these molded article layers can have the same layer thickness. However, the shaping tool can also be constructed in such a manner that it applies different layer thicknesses. Therefore, especially complex structures can be constructed as molded articles in accordance with the selection of the sequence of the shaping tools and the corresponding molded article layers. In particular, the printing plate can be designed in such a manner that it precisely positions the transfer of the molded article layer onto the layer carrier or onto the older molded article layer. Therefore, even especially small, filigree or nested molded article layers can be constructed and shaped as molded articles.

In a special embodiment the printing plate is substantially rigid. In the sense of the present invention the printing plate can be considered as substantially rigid if it does not experience any deformation worth mentioning during operation according to the invention. In this case the printing plate withstands being bent conditioned by the material and/or the construction. This is conditioned by the material and/or the construction in as far as the resistance to a bending torque is a function of the rigidity of the material and the size of the cross section of the printing plate.

In an alternative to the just-cited embodiment the printing plate is designed as a sheet. In such an embodiment the transfer of the molded article layer(s) from the sheet onto the layer carrier can be brought about by drawing off the sheet. Such a drawing off would mean a bending of the sheet in at least one surface extension and would be comparable to drawing off a plaster or an adhesive sheet. As a consequence of this bending, the molded article layer could be peeled off more readily. In particular, an already moistened and/or cured molded article layer could be peeled off better in that the sheet is drawn off from the contact surface of the molded article layer. Such a drawing off can be made possible, for example, by the selection of the material of the sheet and/or a sheet thickness selected to be appropriately thin. The sheet thickness of the sheet is preferably less than 2,000 µm, especially 10-2,000 µm, especially preferably 50-500 µm, in particular 50-200 µm and quite especially preferably 100 µm.

In this special embodiment it can furthermore be advantageous if the sheet is rigidly held during the transfer onto the layer carrier. The sheet is preferably placed on a rigid support for this.

In a special embodiment the sheet is transparent to polymerization-inducing, electromagnetic radiation, especially transparent to UV radiation. As a result, the curing of the layer carrier can take place when still in contact with the sheet, which can then subsequently be drawn off from the molded article layer with less effort. The sheet is especially preferably provided with an anti-adhesion coating on at least the contact side which carries the molded article layer or consists of a plastic with corresponding qualities. Suitable materials for an anti-adhesion coating of the sheet are fluorinated hydrocarbons such as, e.g., FEP (fluorinated ethylene propylene), EFTE (ethylene tetrafluoroethylene) or also polytetrafluoroethylene (Teflon, DuPont). FEP and ETF have the additional advantage of a good permeability for UV radiation.

Another aspect of the present invention relates to an apparatus for producing a molded article from at least one molded article layer. It is of course understood that the corresponding apparatus can be provided with structural features which can comprise any combination and possibility of the cited method features which do not mutually exclude each other.

An apparatus in accordance with the invention basically comprises one or more layer carriers for accommodating at least one molded article layer. Furthermore, it comprises one or more printing plates and at least one shaping tool by which a formed article layer can be applied with a defined shape onto the printing plate. The printing plate and/or the layer carrier are designed in such a manner here that applied molded article layers can be positioned relative to each other and can be transferred onto the layer carrier or onto an older molded article layer which is already present on the layer carrier. The apparatus is preferably constructed in such a manner that it makes possible a precise alignment of the printing plate and of the layer carrier relative to one another.

In a preferred embodiment the layer carrier is designed in such a manner that it is substantially level and hardly deforms. In the sense of the present invention this means that the layer carrier can be designed in such a manner that it resists the operating temperatures of the apparatus without plastically deforming. A corresponding layer carrier can, for example, be dimensioned to be sufficiently thick so that it does not deform. The concrete dimensions can be adapted to the dimensions of the printing plate and respectively of the molded layers.

In a special embodiment the printing plate is movably arranged, in particular rotatably arranged.

In a special embodiment the printing plate is permeable to light waves, in particular the printing plate is permeable to UV light.

In an especially preferred embodiment the printing plate consists substantially of quartz glass or sapphire glass.

In a preferred embodiment the printing plate is provided with at least one adhesion-reducing surface. Alternatively or additionally, the printing plate consists of a substantially adhesion-reducing material. In particular, the printing plate is provided with an adhesion-reducing surface selected from the group consisting of: stoving siliconized surface, polysilane coating, fluoropolymer coating, grease-containing coating, wax-containing coating and/or silicate coating.

In a special embodiment the layer carrier is designed in such a manner that it has a high rigidity and chemical inertness even under thermal stressing, preferably at temperatures above 500° C., especially preferably above 800° C. The layer carrier consists especially preferably of a material such as aluminum oxide, corundum, silicon carbide or sapphire.

In a special embodiment the apparatus comprises a plurality of shaping tools. Each shaping tool preferably comprises recesses and is designed so that it defines a different form.

In a special embodiment the shaping tool is designed in such a manner that several molded layers can be printed with each other in one printing process which are then cured one after the other relative to the layer carrier respectively to the older molded layers and are separated from the printing plate. This makes it possible to reduce the number of different printing templates or printing sieves.

In a special embodiment the apparatus comprises a means for applying an adhesion promotor onto a molded article layer on the layer carrier. In particular, the apparatus comprises a spray apparatus or a roller or a stamp pad for applying an adhesion promotor onto a molded article layer and/or onto the layer carrier.

In a special embodiment the apparatus comprises a doctor blade for spreading a deformable mass onto the shaping tool so that a molded article layer is applied through recesses of the shaping tool onto the printing plate.

In a special embodiment the printing plate is substantially rigid. In the sense of the present invention the printing plate can be viewed as substantially rigid if it does not experience any deformation worth mentioning during the operation in accordance with the invention. In this case the printing plate withstands being bent conditioned by the material and/or the construction. This is conditioned by the material and/or the construction in as far as the resistance to a bending torque is a function of the rigidity of the material and the size of the cross section of the printing plate.

In a special embodiment the printing plate is designed as a sheet and in particular it is ensured by its cross-sectional thickness and/or material nature that it is sufficiently flexible at least in one surface extension so that a reversible bending is possible so that the sheet can be drawn off a cured molded article layer.

In a special embodiment the sheet comprises a coating which is very slow to react itself and comprises a low coefficient of friction. The coating preferably comprises a dynamic coefficient of friction of less than 0.1. In an especially preferred embodiment the material has a dynamic coefficient of friction which is equal to the coefficient of adhesive friction of said material. In a supplementary or alternative embodiment the sheet consists of such a material.

It is preferable that the sheet comprises or consists of a material consisting from the group of fluorinated hydrocarbons, especially preferably FEP and/or ETFE.

Another aspect of the present invention concerns the using of a formed article resulting from a method according to the invention for producing three-dimensional microstructures for engineering applications. In particular, molded articles with complex hollow spaces and capillaries in their interior can be produced. The produced molded articles can also be advantageously used for automobile construction, airplane construction and wind turbines since they are especially suitable for producing light construction structures.

Since the method of the invention allows combining materials with different electrical qualities, molded articles can be produced in a special embodiment which contain conducting tracks. Furthermore, even materials with different magnetic qualities, also including permanently magnetic material can be processed. As a result, sensors, for example temperature sensors, pressure sensors and others, or actuators, for example rotating electromotors or linear motors can be produced with the method of the invention and integrated into molded articles.

The molded articles of the invention can comprise in particular filigree structures and geometries.

Another aspect of the present invention provides the using of the molded articles resulting from the method of the invention as catalytic carriers with catalytically active layers printed directly into the molded article. This makes it possible to precisely indicate the layer thickness of the catalytically active layer in the interior of complex molded articles like those which can be produced with the method of the invention. As a result, highly selective chemical reactions can be carried out with the present invention. The catalytically active layers are preferably applied by the selection of an appropriate, plastically deformable mass in the required layer thickness.

Other possible area of application of the molded articles which can be produced by the method of the invention are not conclusive: micro-structured catalysts, heat exchangers, structures for furthering the substance exchange, liquid distributors, separators, sensors, actuators, etc.

On the whole, the method according to the invention offers a number of advantages. In comparison to a direct printing method, it is simpler, for example, to combine different molded article layers in one plane with the method of the invention. In addition, it is especially suitable for producing structures with several different materials. The surface of the printing plate can be selected so that the printed image of individual molded article layers becomes especially good, especially when using printing templates but also in the case of printing sieves, and as a result the entire formed article can be imaged especially precisely. The particular shaping tools can be selected in such a manner that individual, especially thick or especially thin molded article layers can be produced. As a result of the possibility of producing especially thick layers, the number of individual printing procedures can be reduced, which again increases the total efficiency. The positioning of the molded article layer takes place during the transfer of the molded layer from the printing plate onto the layer carrier. As a result, a requirement for the precise positioning of the shaping tool relative to the printing plate and of the printing procedure are not necessary. Therefore, the printing procedure can be carried out on the whole in a simpler and more efficient manner as well as more advantageously.

All special embodiments can be combined in any manner in the framework of the present invention to the extent that they do not mutually exclude each other.

The invention is explained in detail in the following using concrete exemplary embodiments in detailed descriptions without, however, being limited to them. Otherwise, other advantageous embodiments and feature combinations of the present invention result from this detailed description and the totality of the claims.

SHORT DESCRIPTION OF THE DRAWINGS

The drawings used to explain the exemplary embodiments schematically show:

Figure 12:
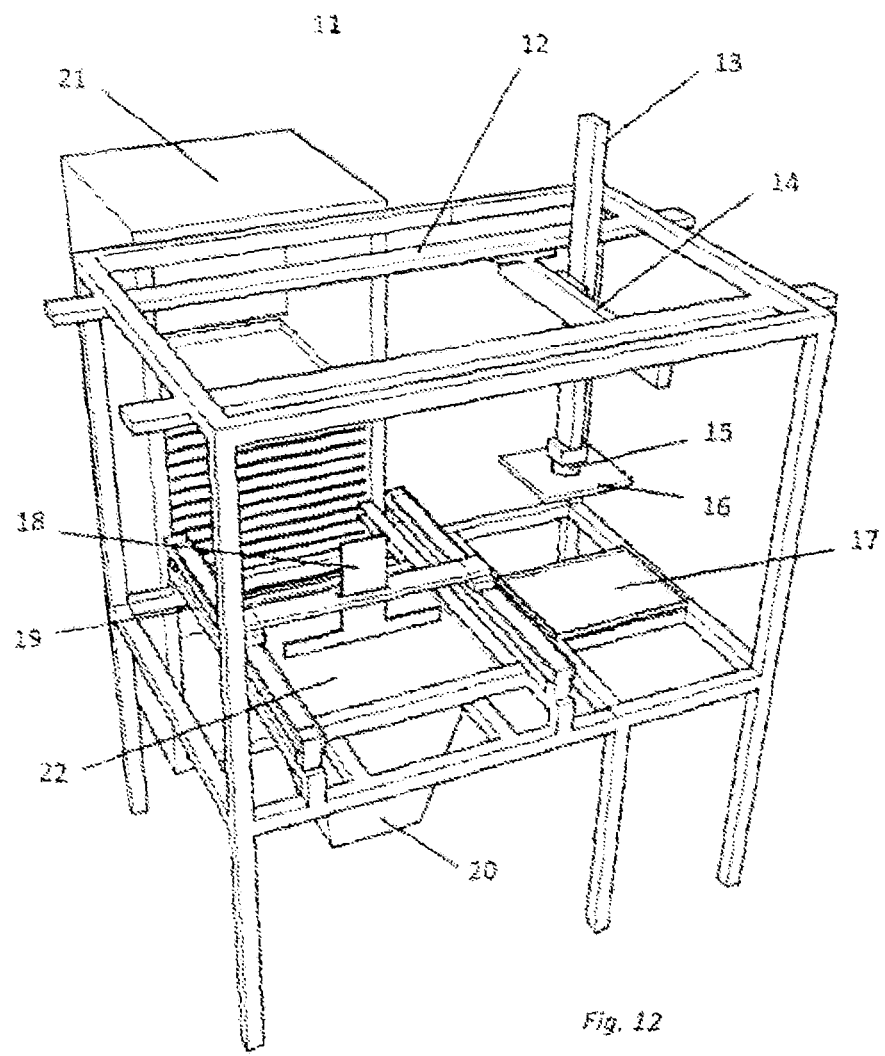

FIG. 12 schematically shows an apparatus for carrying out the method of the invention.

The same parts are basically provided with the same reference numerals in the figures.

WAYS OF CARRYING OUT THE INVENTION

Example 1

An example of a moldable mass in which photopolymers are used as binders is described here. The mass is intended for the production of ceramic structures based on aluminum oxide. The mass consists of approximately 80% aluminum oxide powder, with a quality for high-grade technical ceramic material and with an average grain size of a few micrometers. Hexane-1.6 diol diacrylate is used as binder. In order to control the rheological properties, small amounts of suitable auxiliary dispersion means are added. 0.5% 2, 2-dimethoxy-2-phenylacetophenone is added as photoinitiator.

Figure 1:
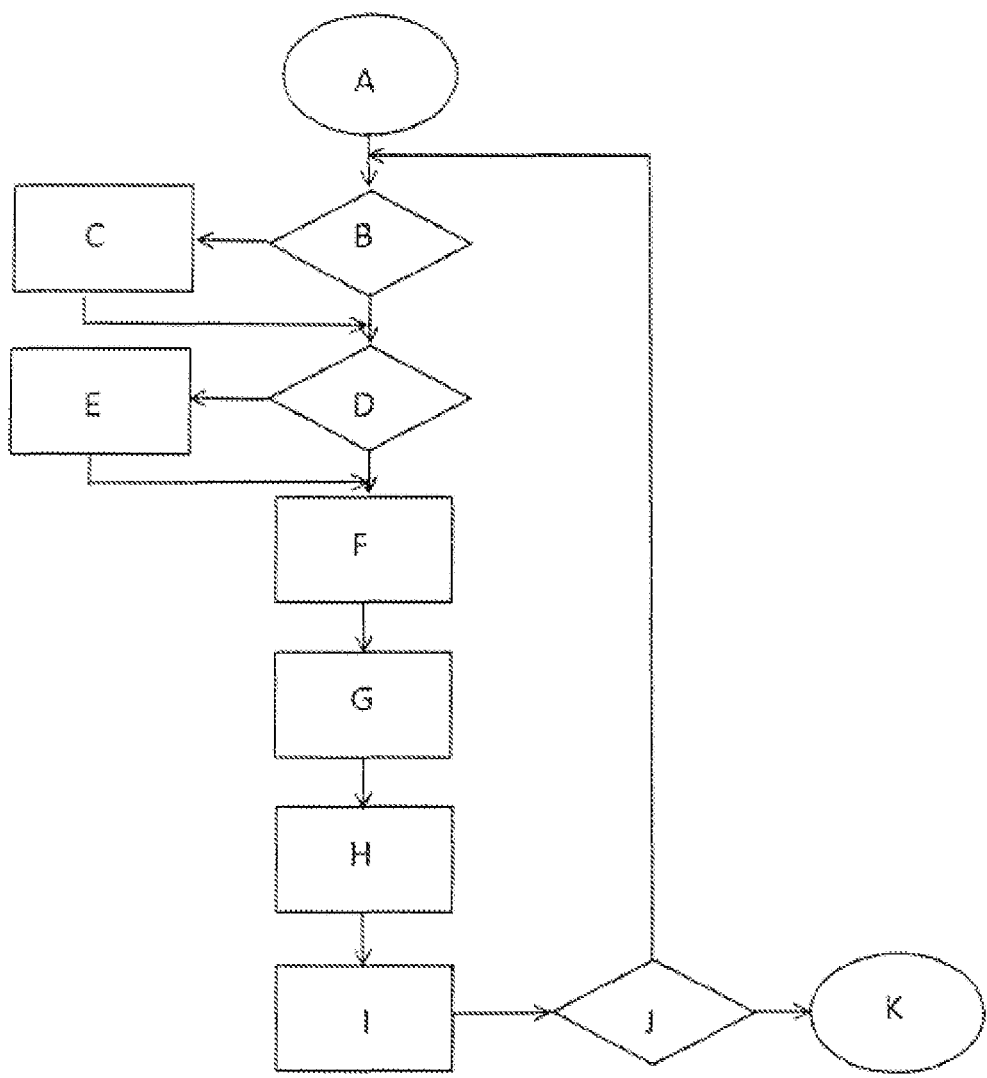
FIG. 1 shows a schematically simplified flow chart of a method according to the invention.

FIG. 1 shows an exemplary flowchart for carrying out the method according to the invention. At first, a layer carrier is made available A for accommodating the molded article layer and the resulting molded article.

The layer carrier can be constructed in the present example from a level sapphire glass plate with a layer thickness of 2 mm. In a first step a thin film of an adhesive promoter can be applied on to the surface of the layer carrier so that subsequently the moistening becomes better and as a result also the connection between the layer carrier and the new form layer. To this end a stamp pad, a roller or a spray nozzle can be used C. However, this step is not obligatory and can be omitted in a few instances B.

Furthermore, a printing plate is made available. In order that step 1 can be better carried out subsequently, the surface of the printing plate is modified in such a manner that the adhesion of the cured molded article layer to it is only very slight. To this end, various techniques can be used. Suitable measures for reducing the adhesion of the molded article layer are, for example, a stoving siliconization, a thin coating with synthetic waxes, a coating with polydimethylsiloxane or with other polysilanes, a thin, grease-containing layer or a thin silicate layer. A few of the described methods for the reduction of the adhesion of the molded article layer on the printing plate require a regular repetition of the treatment of the printing plate prior to individual passages or prior to every passage. If this is the case, the printing plate is suitably prepared for the printing D, E.

Now, the plastically deformable mass is applied onto this printing plate by a template comprising recesses in the form of the molded article layer resulting in this printing procedure. To this end the template is substantially filled with the plastically deformable mass and applied on with a doctor blade in such a manner that a penetrating pressure takes place through the template onto the printing plate. Then, the template is removed.

The printing plate and the layer carrier are subsequently exactly positioned relative to one another so that their interval corresponds to the desired layer thickness and that the molded article layer is aligned exactly as desired on the layer carrier G. This takes place in such a manner that that the molded article layer physically contacts the layer carrier. A possibility for carrying this out is to rotate the printing plate substantially through 180° and to align it over the firmly mounted layer carrier. Another possibility is to work with a firmly mounted printing plate and to position the layer carrier over it.

The mass forming the molded article layer is now cured H. In the case of masses based on photopolymers, this takes place, for example, by the rays of a lamp whose light contains the wavelengths which excite the photoinitiator through the transparent printing plate. The wavelength range relevant for this expectation is frequently in the ultraviolet range of the light spectrum in the case of very shortwave frequencies. In the case of the photoinitiator of the above-cited example, 2, 2-dimethoxy-2-phenylacetophenone the relevant wavelength is, for example, 280 nm. In this case a quartz glass plate or a sapphire plate can be considered as a transparent printing plate which comprises the necessary stability and robustness as well as a sufficient transparency to light in the ultraviolet wavelength range. In the case of other deformable masses the curing step can take place by thermally induced polymerization or by thermally accelerated physical drying of the mass.

After the curing the molded article layer adheres molded article layer to the layer carrier. Thereafter, the cured layer is separated from the printing plate and as a result the is transferred from the printing plate onto the layer carrier I.

In order to facilitate the separation of the molded article layer from the printing plate the surface of the printing plate was modified in such a manner that the molded article layer it hears only slightly to it (see step C). Therefore, the adhesion of the molded article layer to the layer carrier is distinctly stronger than to the printing plate and upon the separation the molded article layer remains on the layer carrier, respectively on the older molded article layers.

If the printing is continues, that is, if other molded article layers are provided J, then the process begins again at step B. If this is the second or a later printing, the printing plate and the layer carrier are positioned relative to one another in such a manner that the current molded article layer contacts the older molded article layer. Of course, it is also possible to transfer molded article layers adjacently, that is, so that the current molded article layer also contacts the layer carrier. This is especially appropriate if molded article layers consisting of different materials but with different templates are to be printed.

Now, a thin layer of adhesion promotor is selectively applied also with the second or following molded article layer onto the older molded article layer so that a more complete moistening of the older molded article layer results by the new one C.

Now, the printing plate is selectively pretreated even with the second or following molded article layer in such a manner that the molded article layer can be subsequently readily separated from it E.

Once all desired molded article layers have been produced, cured and transferred onto the molded article carrier, the process is ended K. Depending on the deformable mass used and on the material from which the finished part is to consist, the molded article produced in this manner on the layer carrier and consisting of at least one molded article layer must finally still be supplied to a thermal treatment, for example, to a sintering or a pyrolysis.

The number of passages H is determined by the desired number of molded article layers. The entire process can take place in a computer-controlled manner. That is, an apparatus can be provided with a rack with a certain defined number of templates in order to carry out a defined sequence of printing procedures. This apparatus can be designed to be modular, as a result of which the appropriate tools can be flexibly replaced.

The execution of the method is illustrated again in an exemplary manner in the FIGS. 2 to 11 using the individual method steps.

Figure 2:
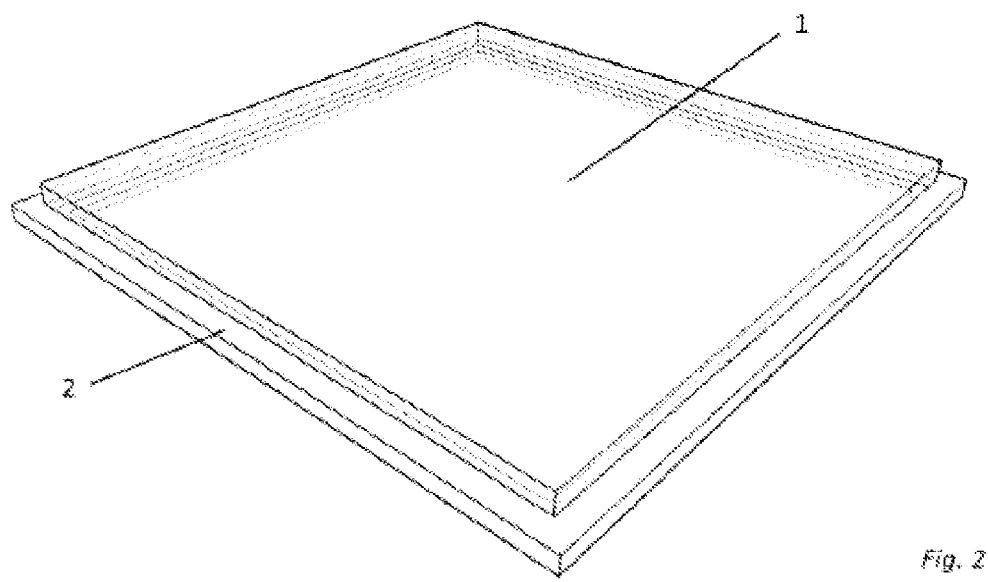
FIG. 2 shows an empty printing plate.
Figure 3:
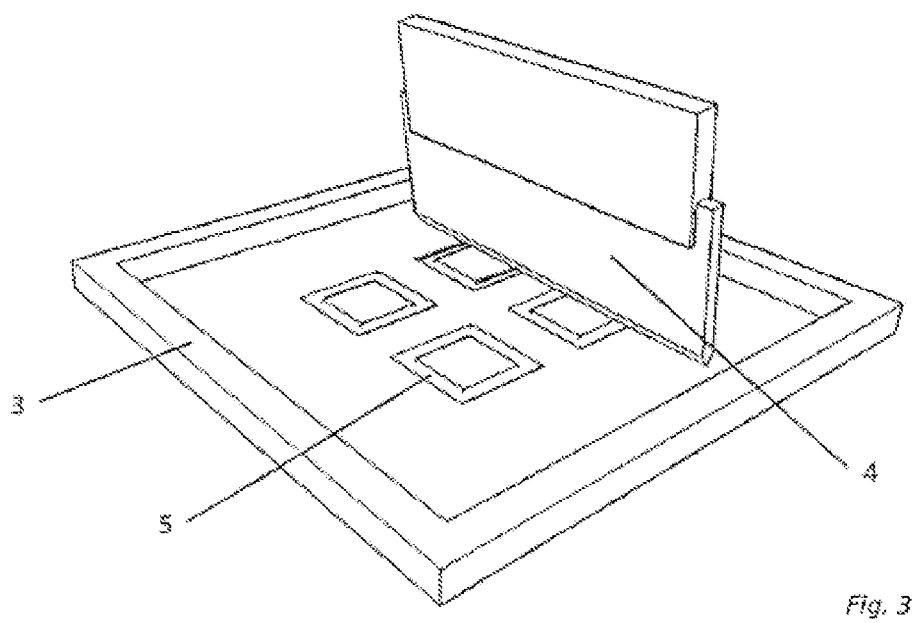
FIG. 3 shows the generation of molded article layers by a shaping tool.

FIG. 2 shows a printing plate 1 suitable for being used in the method of the invention. The printing plate 1 consists of a quartz glass and comprises a frame 2.

Figure 5:
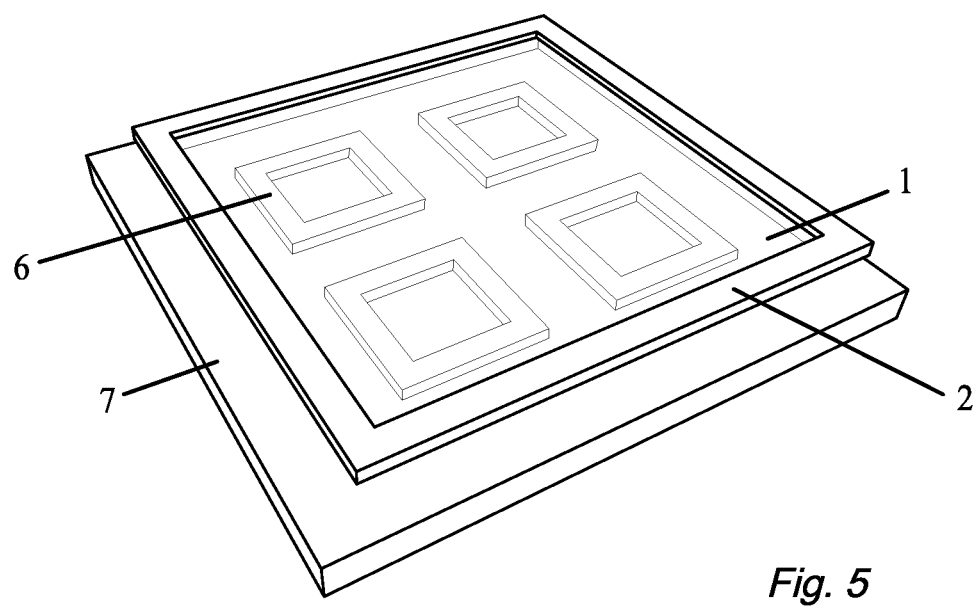
FIG. 5 shows the positioning of the printing plate over the layer carrier.
Figure 4:
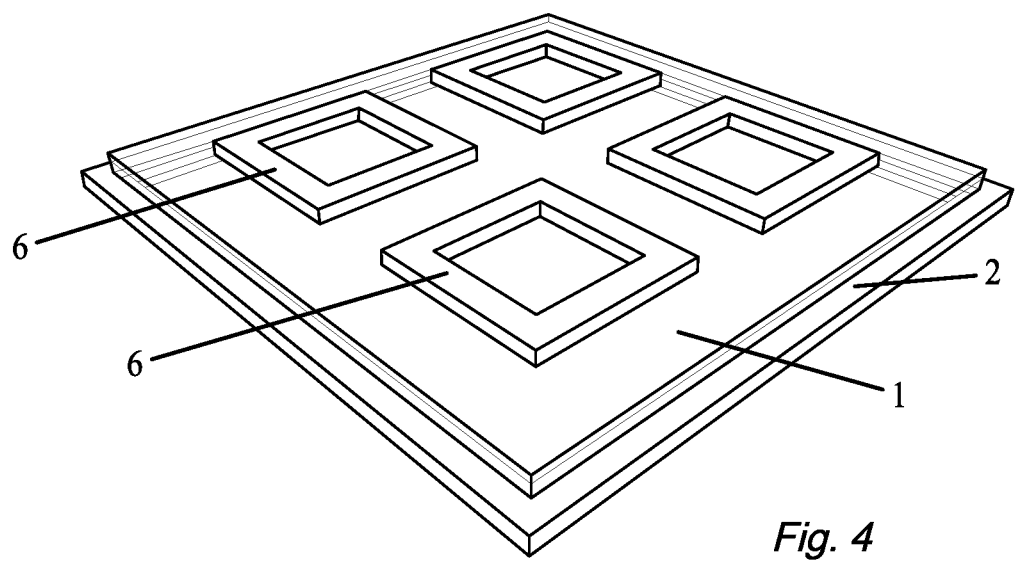
FIG. 4 shows the generated molded article layers on the printing plate.

A plastically deformable mass (not shown) is supplied by a template 3 through the recesses 5 with the aid of a doctor blade 4 onto the printing plate 1 shown in FIG. 2. A printing image is produced which forms a molded article layer of the molded article to be produced. FIG. 4 shows the correspondingly printed printing plate 1. Four identical molded article layers 6 are shown on it whose shape was defined by the recesses 5 of the template 3. FIG. 5 shows how the printing plate 1 is now positioned with the molded article layers 6 over the layer carrier 7 in such a manner that the molded article layers 6 make contact with the layer carrier 7. In this position the molded article layers are cured between the printing plate and the layer carrier.

Figure 6:
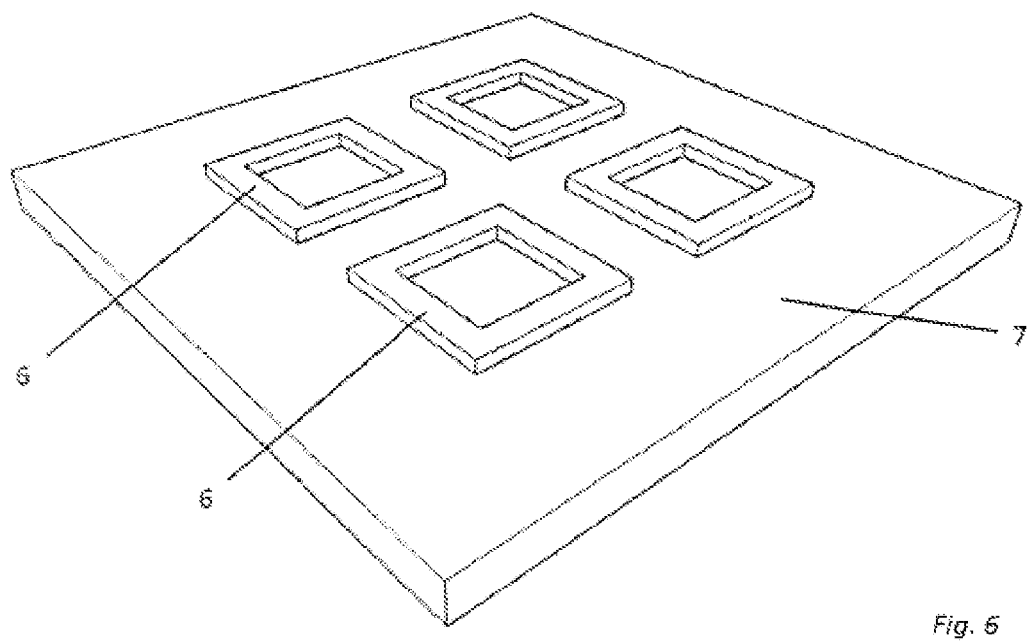
FIG. 6 shows the layer carrier with the molded article layers.

FIG. 6 shows the corresponding layer carrier 7 with the molded article layers 6 now located on it after the printing plate was separated from the cured molded article. In the meantime the printing plate 1 was made available again.

Figure 7:
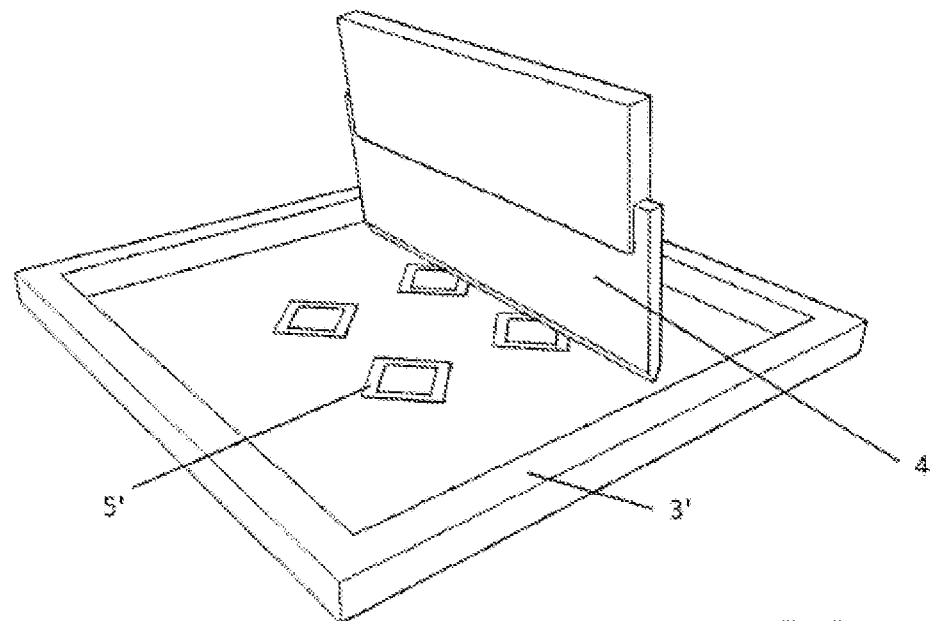
FIG. 7 shows a following printing.
Figure 8:
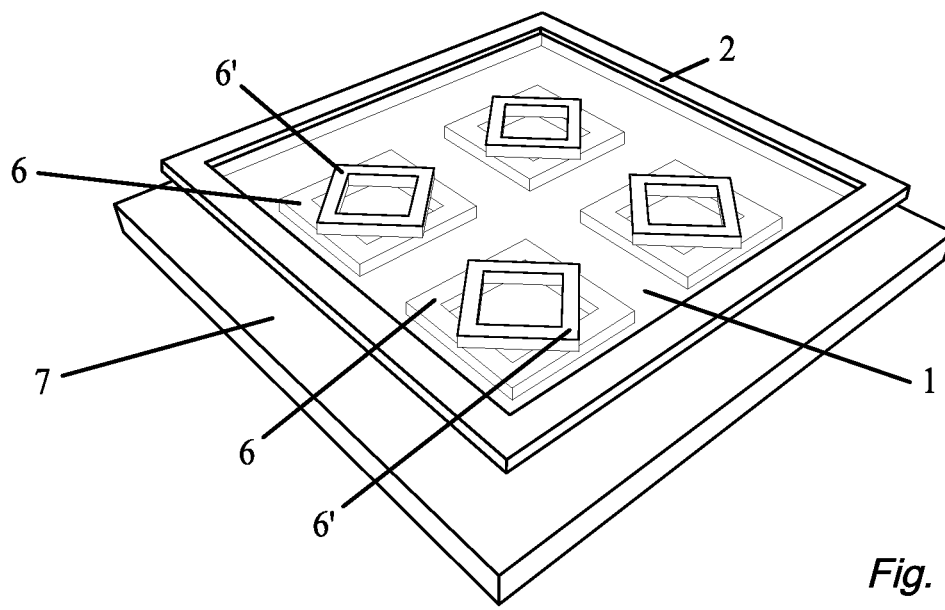
FIG. 8 shows the transfer of the following molded article layers onto the older molded article layers.

FIG. 7 shows another template 3' with a deviating recess pattern and recesses 5' with which the plastically deformable mass (not shown) was pressed onto the printing plate 1 in an analogous manner by a doctor blade 4. This newly printed printing plate is now also positioned over the layer carrier 7, which is shown in FIG. 8. The molded article layer 6' make contact here with the older molded article layer 6. The frequency lines 6' are cured in this state. A polymerization step can be readily carried out in the process steps of the curing of the FIGS. 5 and 8 in that light with the appropriate, required UV wavelength is loaded through the transparent printing plate 1 onto the molded article layers 6, 6' to be cured.

The molded article layers 6' form connections with the older molded article layers 6 so that the resulting molded article is substantially in one piece. The connections can be of one material to the same material. Reticulations in the case of certain materials can also occur.

Figure 9:
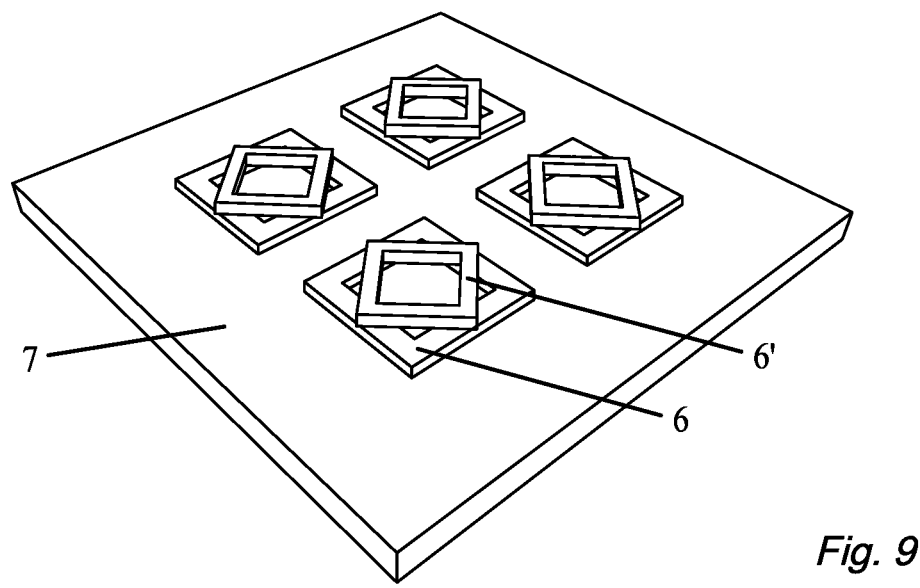
FIG. 9 shows the layer carrier with two planes on molded article layers.

FIG. 9 shows the layer carrier 7 with four molded articles which comprises two planes and consist of two molded article layers 6, 6' integrally connected to one another.

The previous steps can be repeated as often as desired. Also, it is not necessarily obligatory that the current molded article layers are positioned in such a manner that they build up on the older molded article layers.

Figure 10:
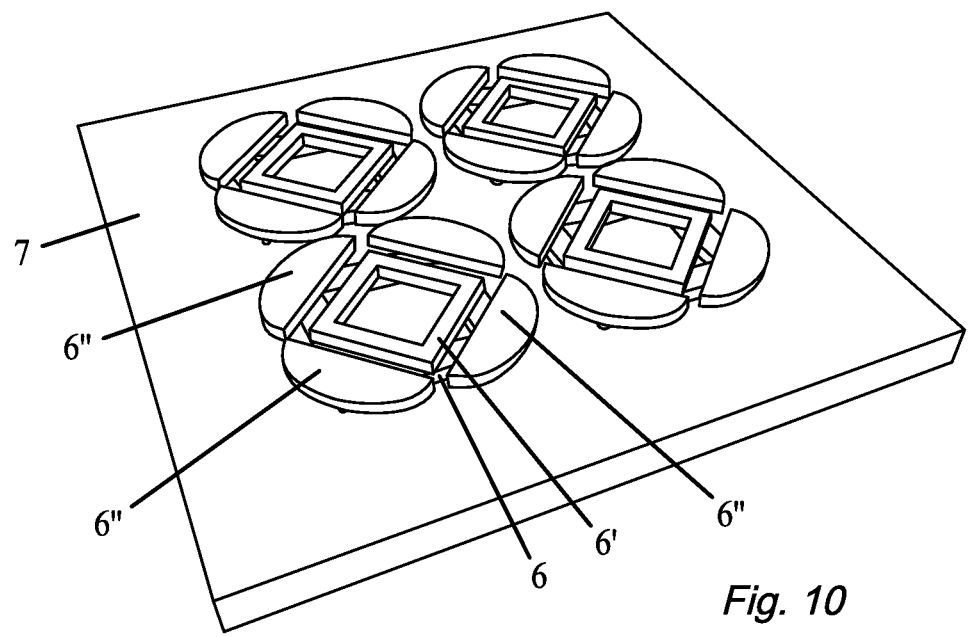
FIG. 10 shows an example with differently formed molded article layers.
Figure 11:
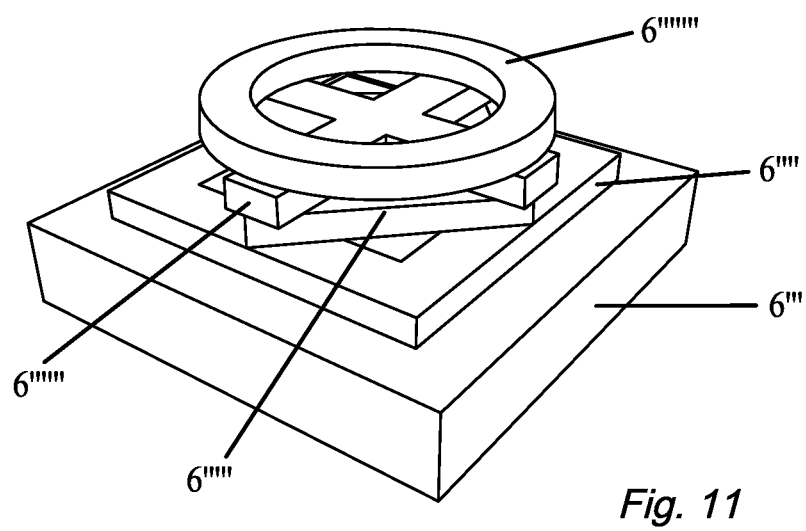
FIG. 11 shows an example of a complexly built-up molded article consisting of several planes and molded article layers.

The example of FIG. 10 shows four molded articles in which the molded articles consist of on the whole three molded article layers 6, 6', 6" each of which was produced in one printing procedure. However, on the whole the molded articles consist only of two layer planes. FIG. 11 shows by way of example a molded article with five layer planes and which consists of five molded article layers 6''', 6'''', 6''''', 6'''''', 6'''''''.

The simple geometric structures in the figures are basically selected only for purposes of viewing. Basically, the molded article layers and their designs are not subject to any limits.

The method according to the invention is also suited for producing three-dimensional molded articles such as are shown in WO 2014/043823 A1. These molded articles comprise several molded article layers supported over each other web-by-web.

The molded article layers of the present invention can have layer thicknesses of 10 µm to 50 mm. They have especially preferably layer thicknesses of between 50 and 3000 µm. On the whole, a molded article according to the invention can have outside dimensions of between 1 mm and 5,000 mm, in particular between 4 and 500 mm, especially between 10 and 300 mm, and in particular around 50 mm, depending on the use. These magnitudes are especially suitable for the production of micromixers and catalysts. For larger structural components in light construction the appropriate dimensions can be larger.

FIG. 12 schematically shows by way of example an apparatus 11 suitable for carrying out the method of the invention. The apparatus 11 substantially comprises a frame which comprises the appropriate guides for operating the movable parts of the apparatus. A rail system serves to position a layer carrier 16.

This rail system comprises an X axis of the positioning system 12, a Y axis of the positioning system 14 and a Z axis of the positioning system 13. In addition, the layer carrier 16 is connected by a rotational connection 15 supported in an articulated manner to the Z axis of the positioning system 13. This makes it possible for the layer carrier to assume the necessary positioning in all axes in a movable manner in order to carry out the method of the invention. An appropriate shaping tool can be supported in a template magazine 21. As a result of this template magazine 21, it is possible to prepare a number of predefined shaping tools such as, for example, templates or sieves and to automate the printing in this manner. During operation a replacement apparatus assumes the moving outward of the templates 22 (by way of example) over the printing plate (not shown). A doctor blade 18 is positioned above the template 22 for spreading the corresponding mass which is applied from an automatic dispensing system (not shown).

At the same time the layer carrier 15 can be impregnated with an appropriate adhesion promoter by a stamp pad 17. The positioning system of the layer carrier 16 can be determined by a vision system consisting of camera, lens and analysis software. For the sake of simplicity, the system is not shown in the present representation. Once the printing procedure has been concluded, the template used is pushed back via the guides 19 of the automatic replacement system into the magazine 21. The layer carrier 16 can now be lowered onto the printing plate by the positioning system and exactly aligned. A UV radiator 20 can now initiate the polymerization and curing through the transparent printing plate. As soon as the curing has been concluded, the layer carrier 16 can be lifted off again. As a result of this movement, in the present example the molded article layer is separated from the printing plate and forms an older molded article layer on the layer carrier 16.

This apparatus shown here is shown solely by way of example and can be constructed with several printing plates with associated template replacement apparatuses for the simultaneous printing of several structural components.

The invention claimed is:

1. A method for manufacturing molded articles consisting of at least one molded article layer, comprising the steps:
   a) a layer carrier is made available for accommodating at least one molded article layer;
   b) a molded article layer is applied onto a printing plate, wherein the molded article layer is applied by a shaping tool onto the printing plate, wherein one or more plastically deformable masses are supplied through recesses of the shaping tool onto the printing plate in order to form the molded article layer;
   c) positioning the printing plate and the carrier layer relative to each other by executing a movement of the printing plate and/or the layer carrier and contacting the molded article layer on the printing plate to either the layer carrier or to an older molded article layer on the layer carrier;
   d) curing of the molded article layer so that it becomes an older molded article layer itself or forms a composite with such an older molded article layer on the layer carrier and transfer of the cured molded article layer(s) from the printing plate onto the layer carrier;
   e) making the printing plate available for accommodating other molded article layers and repetition of the steps b) to d),
   wherein a plurality of plastically deformable masses with different properties are applied through various recesses in the shaping tool onto the printing plate to form one of the molded article layers consisting of different materials,
   wherein the plastically deformable masses contain a powder of a base material as suspension, selected from the group consisting of: metals, steel alloys, hard metals, colored metals, noble metals, ceramic materials, metal-ceramic-composite materials, glass, plastics and/or plastic-composite materials with fiber reinforcement or metal particles or particles of ceramic materials.

2. The method according to claim 1, wherein the shaping tool is a template and in particular the molded article layer is defined by recesses of the shaping tool.

3. The method according to claim 2, wherein the one or more plastically deformable masses are applied through the recesses of the shaping tool onto the pressure plate in order to form the molded article layer.

4. The method according to claim 3, wherein a paste with thixotropic properties is used as deformable mass.

5. The method according to claim 1, wherein the printing plate is designed in such a manner that the molded article layer poorly adheres to it and has a surface energy less than 40 mN/m with the molded article layer.

6. The method according to claim 1, wherein the older molded article layer on the layer carrier or the layer carrier itself is provided with an adhesion promotor before a next molded article layer is applied on it.

7. The method according to claim 1, wherein the method according to step d) also comprises the following step:
   f) separation of the printing plate from the cured molded article layer.

8. The method according to claim 7, wherein at least one of the plurality of plastically deformable masses serves as support mass of the molded article and can be removed again from the molded article by mechanical, chemical or thermal methods.

9. The method according to claim 1, wherein the molded article is sintered, in particular is sintered after the conclusion of the building up of the molded article.

10. The method according to claim 1, wherein the curing comprises a polymerization step, in particular a polymerization step selected from the group consisting of photo-induced, thermally induced or chemically induced polymerization.

11. The method according to claim 10, wherein a photo-induced polymerization by loading the molded article layer with light takes place through the printing plate.

12. The method according to claim 1, wherein the curing of the molded article layer takes place by a physical process such as, for example, by drying and/or cooling off.

13. The method according to claim 1, wherein the printing plate is designed as a sheet and the transfer of the molded article layer(s) from the printing plate onto the layer carrier comprises drawing off the sheet.

14. A method, comprising: using of a molded article obtainable from the method according to claim 1 as a static mixer.

15. A method, comprising: using of a molded article obtainable from the method according to claim 1 for producing a light construction structure.

* * * * *